(12) United States Patent
Kao

(10) Patent No.: US 6,718,907 B2
(45) Date of Patent: Apr. 13, 2004

(54) DOUBLE-SIDED METER

(76) Inventor: Shen Mu Kao, No. 6-2, Lane 338, Da Hu Rd., Ying Ko Chen, Taipei Hsien (TW)

( * ) Notice: Subject to any disclaimer, the term of this patent is extended or adjusted under 35 U.S.C. 154(b) by 44 days.

(21) Appl. No.: 10/176,688

(22) Filed: Jun. 24, 2002

(65) Prior Publication Data

US 2003/0233973 A1 Dec. 25, 2003

(51) Int. Cl.$^7$ .............................................. G01D 13/22
(52) U.S. Cl. ....................... 116/300; 116/301; 24/546
(58) Field of Search ................................ 116/300, 301, 116/305, 304, 284, 281, 296, DIG. 3, 321, 322, 307; 24/546, 547; 340/870.02, 870.03

(56) References Cited

U.S. PATENT DOCUMENTS

| | | | | |
|---|---|---|---|---|
| 1,432,566 A | * | 10/1922 | Metcalfe ...................... | 368/59 |
| 1,636,752 A | * | 7/1927 | Mitchell ...................... | 116/323 |
| 1,999,073 A | * | 4/1935 | Awrey ........................ | 116/301 |
| 2,392,581 A | * | 1/1946 | Juhasz ........................ | 73/115 |
| 3,046,931 A | * | 7/1962 | Beer .......................... | 116/292 |
| 3,357,394 A | * | 12/1967 | Ingham et al. ............... | 116/271 |
| 5,305,290 A | * | 4/1994 | Yoo ............................ | 368/76 |
| 5,353,264 A | * | 10/1994 | Corbin, III ................... | 368/19 |
| 5,607,078 A | * | 3/1997 | Nordberg et al. ........... | 220/556 |

FOREIGN PATENT DOCUMENTS

JP       11202057 A     *  7/1999

* cited by examiner

Primary Examiner—Diego Gutierrez
Assistant Examiner—Tania Courson
(74) Attorney, Agent, or Firm—Rosenberg, Klein & Lee

(57) ABSTRACT

A double-sided meter includes a case having two open ends, and a movement mounted in the case for measuring temperature, pressure, humidity, or other measurements. The movement is provided at front and rear surfaces with two sets of dial disc and pointer to enable observation of reading values at either side of the meter. The double-sided meter further includes at least one clip-on index that is so shaped that it has some extent of elasticity for fitly and movably attaching to a peripheral wall of the meter. Pointed free ends of the clip-on index are pointed toward scales on the dial discs at two sides of the meter to indicate a desired range of reading values.

7 Claims, 8 Drawing Sheets

DOUBLE-SIDED METER

FIELD OF THE INVENTION

The present invention relates to a meter, and more particularly to a double-sided meter having dial discs and pointers provided on both sides thereof.

BACKGROUND OF THE INVENTION

A meter is used to indicate a certain type of measured value, such as pressure, rotating speed, temperature, or humidity. Such meters are widely used on production lines in plants. For some types of plants, it is very important and necessary to frequently observe readings on these meters.

There are complicate pipelines in many large-scale plants, and it is time-consuming to observe the meters mounted on these pipelines, particularly when the conventional meters 9 are one-sided meters having only one indicating side 91, as shown in FIG. 1. When the conventional one-sided meters are used in the large-scale plants having complicate pipelines, an operator must always go to the indicating side 9a of the meters 9 to observe the readings on the meters. It is possible the operator has to take a long time to reach a meter that faces away from the operator's observing position. When there are many one-sided meters facing toward different directions, the operator would have to take considerably long time to complete the observation of these meters, and it is, of course, very inconvenient to do so.

Moreover, it is a common practice to attach an additional index to a peripheral wall of the conventional one-sided meter to indicate a desired range of readings. Such index usually has a cross section close to a letter I and tends to separate from the meter when the latter is vibrated. And, the index frequently falls when it is pushed along the peripheral wall of the meter to a different position.

It is therefore desirable to develop an improved meter that enables convenient observation of a reading value shown thereon.

SUMMARY OF THE INVENTION

A primary object of the present invention is to provide a double-sided meter having identically scaled dial discs and synchronously movable pointers provided at two sides of a movement of the meter, so that an operator may conveniently observe the reading values from either side of the meter at any time without the need of winding through complicate pipelines.

Another object of the present invention is to provide a clip-on index for fitly attaching to a double-sided meter. The clip-on index is so configured that it has some extent of elasticity and two bent sections near two ends thereof, enabling it to fitly and firmly clamp on a peripheral wall of the meter. Two free ends of the bent sections of the clip-on index are formed into two pointed index fingers for locating above the same scale on two sides of the meter to indicate a desired range of readings.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
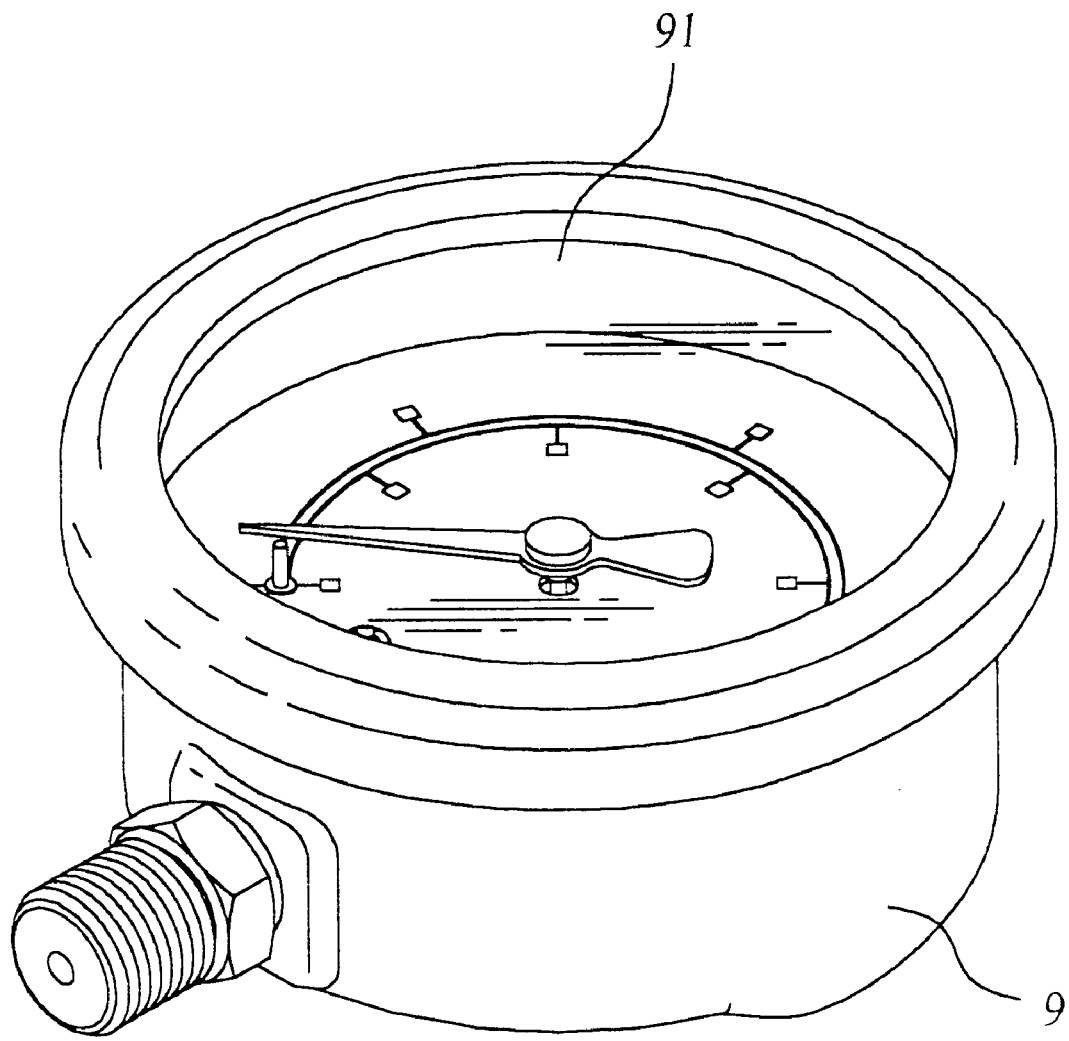
FIG. 1 is a perspective view of a conventional meter.
Figure 2:
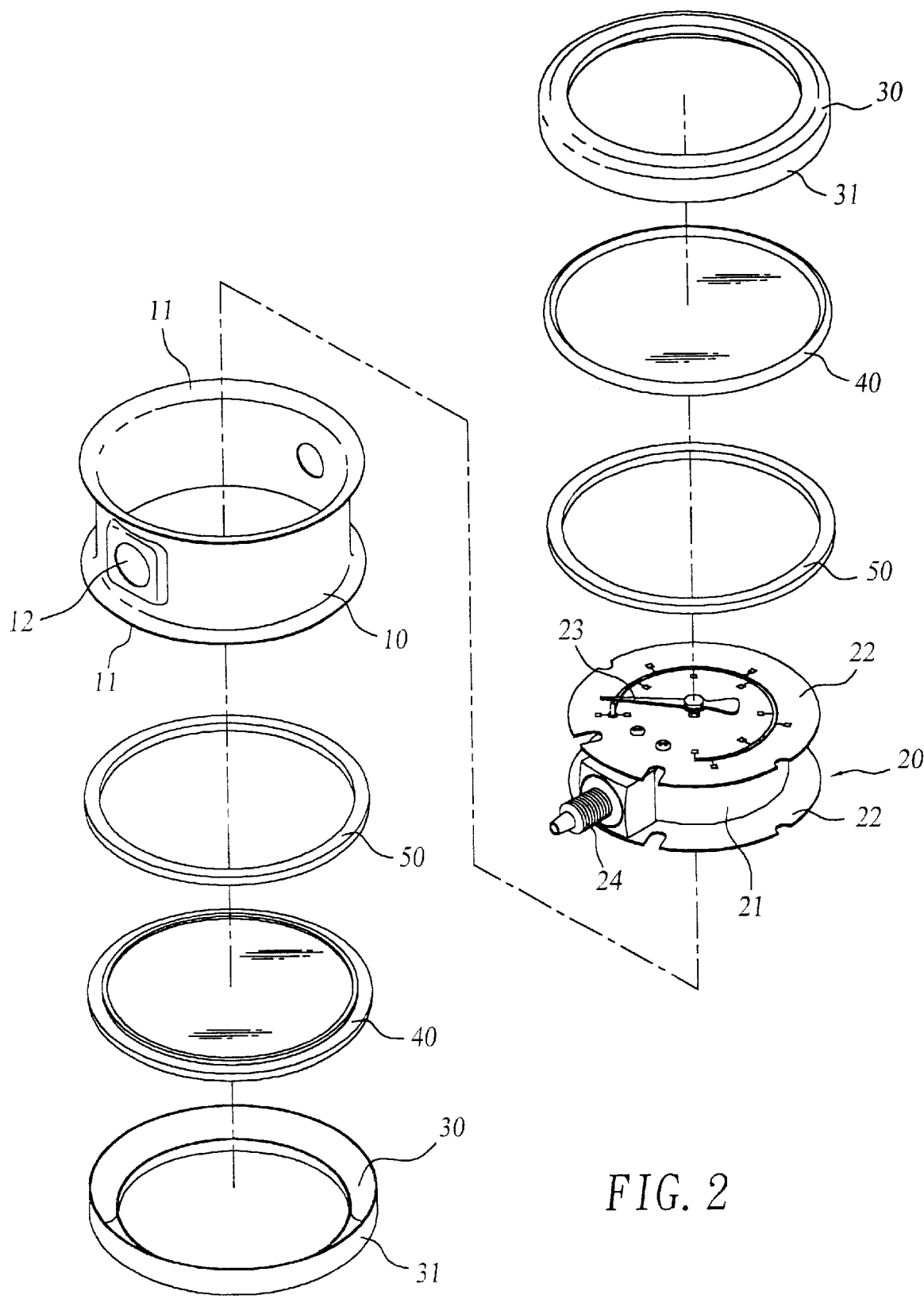
FIG. 2 is an exploded perspective view of a double-sided meter according to the present invention.
Figure 3:
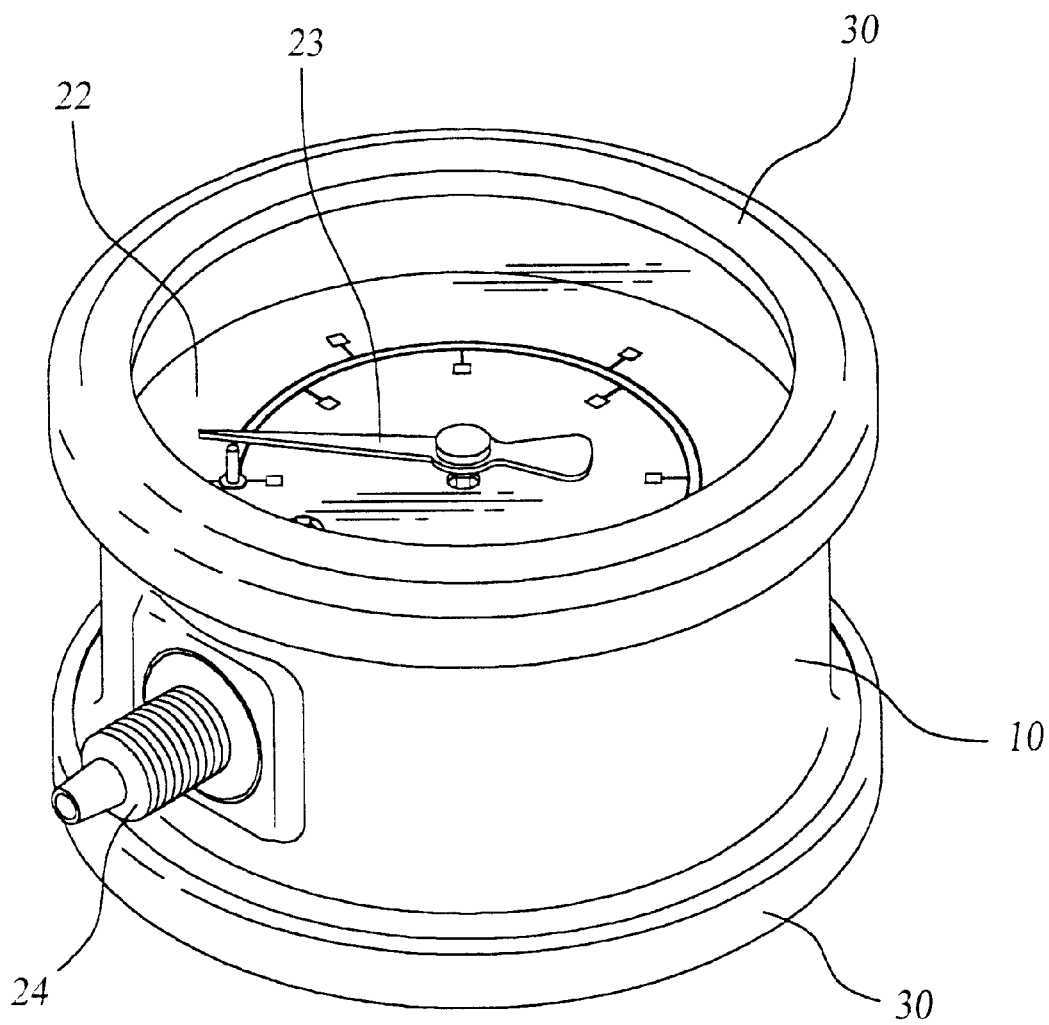
FIG. 3 is an assembled perspective view of the double-sided meter of the present invention.

Please refer to FIGS. 2 and 3 that are exploded and assembled perspective views, respectively, of a double-sided meter according to the present invention. As shown, the present invention includes a case 10 having two open ends for a measuring device 20 to mount therein. The measuring device 20 includes a movement 21, two sets of dial disc 22 and pointer 23 separately provided at front and rear surfaces of the movement 21, and a nipple 24 sideward projected from the movement 21 and a round hole 12 on the case 10 to connect to a pipeline to be inspected. When the movement 21 senses any measured result, it drives the pointers 23 to turn and indicate a reading value on the dial discs 22.

Figure 4:
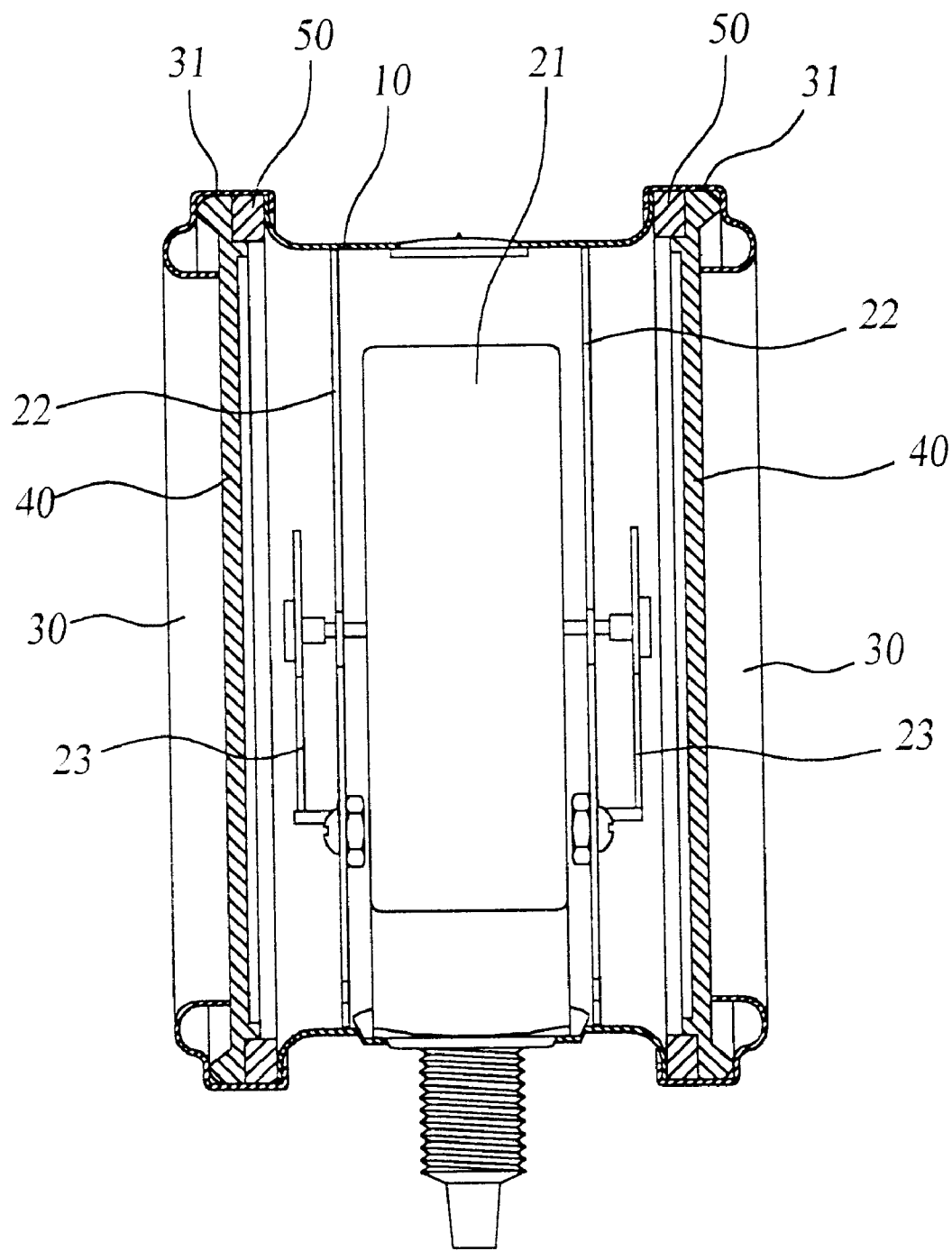
FIG. 4 is a sectioned side view of the double-sided meter of the present invention.

To prevent a damping liquid filled in the case 10 from leaking, the case 10 is provided at both front and rear sides from outer to inner end with a seal ring 30, a rubber gasket 50, and a transparent sheet 40. As can be seen from FIG. 2, the seal ring 30 before being attached to the case 10 has a straight lateral wall portion 31. However, the straight lateral wall portion 31 is elastically bent to fitly contact with a flange 11 of the case 10 when it is attached to the open end of the case 10, as shown in FIG. 4, which is a sectioned side view of the present invention, so as to firmly hold the rubber gasket 50 and the transparent sheet 40 to each side of the case 10.

The double-sided meter of the present invention is convenient for use because both sides of which are provided with dial discs 22 and pointers 23. When the double-sided meters are used in a big-scale plant at where large quantities of meters are needed, an operator is enabled to check and record reading values indicated on all meters from only one position. Since the double-sided meter has identical front and rear sides, it can be advantageously installed at high efficiency, too.

It is appreciated that the dial discs 22 and the pointers 23 at two sides of the case 10 can be replaced with liquid crystal display panels.

Figure 5:
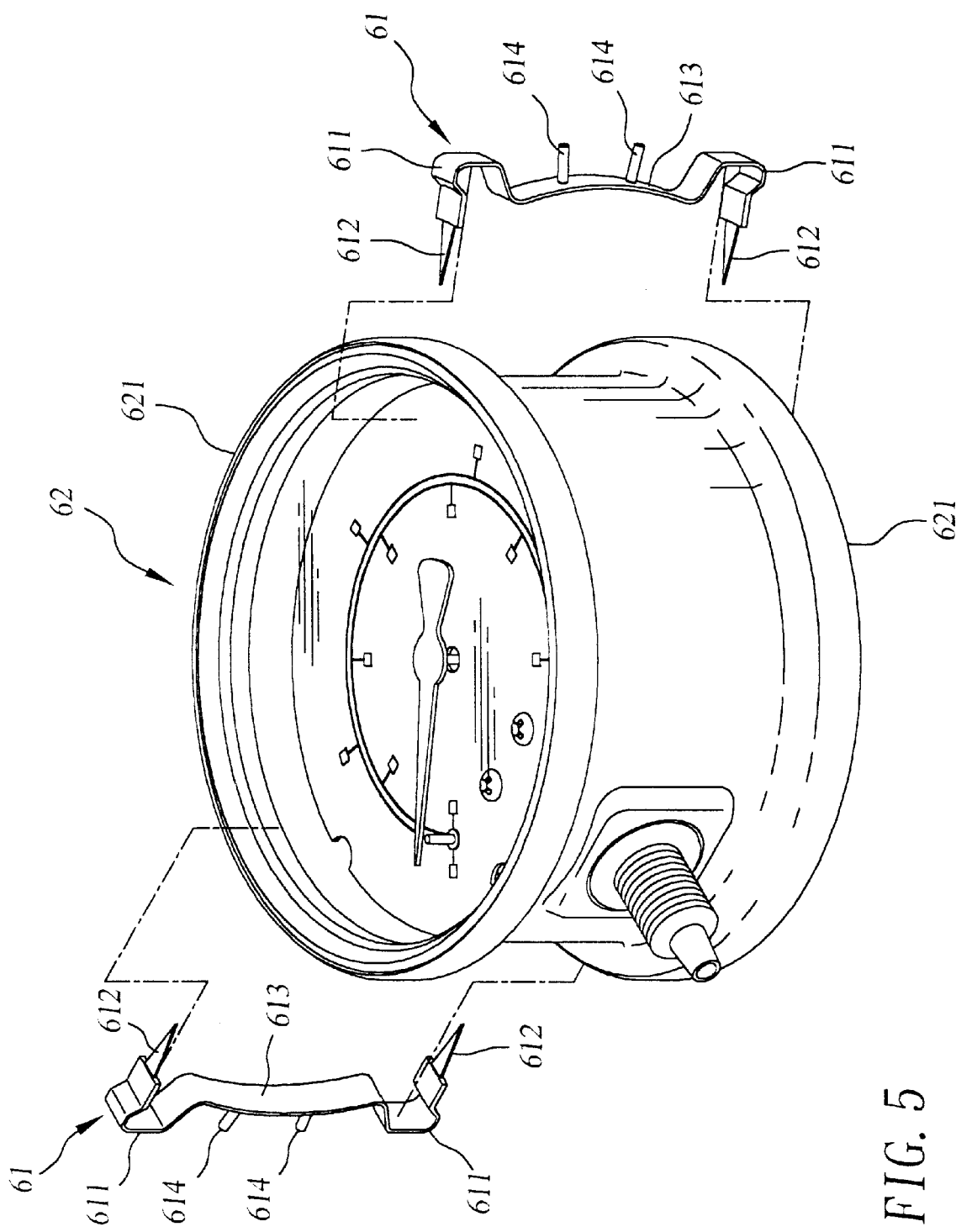
FIG. 5 shows clip-on indexes for the double-sided meter of the present invention, wherein the clip-on indexes are separated from the double-sided meter.

Please refer to FIG. 5. The present invention further includes a predetermined number of clip-on indexes 61. As shown, the clip-on index 61 has a cross section close to a symbol of $\Sigma$ to provide some extent of elasticity and flexibility. The clip-on index 61 is provided near two outer ends with two bent sections 611 having profiles corresponding to that of two flanges 621 of a double-sided meter 62. Free ends of the bent sections 611 are formed into two index fingers 612. A middle part of the clip-on index 61 between the two bent sections 611 is a transverse section 613 having a predetermined curvature. Two push bars 614 are projected from an outer side of the transverse section 613.

Figure 6:
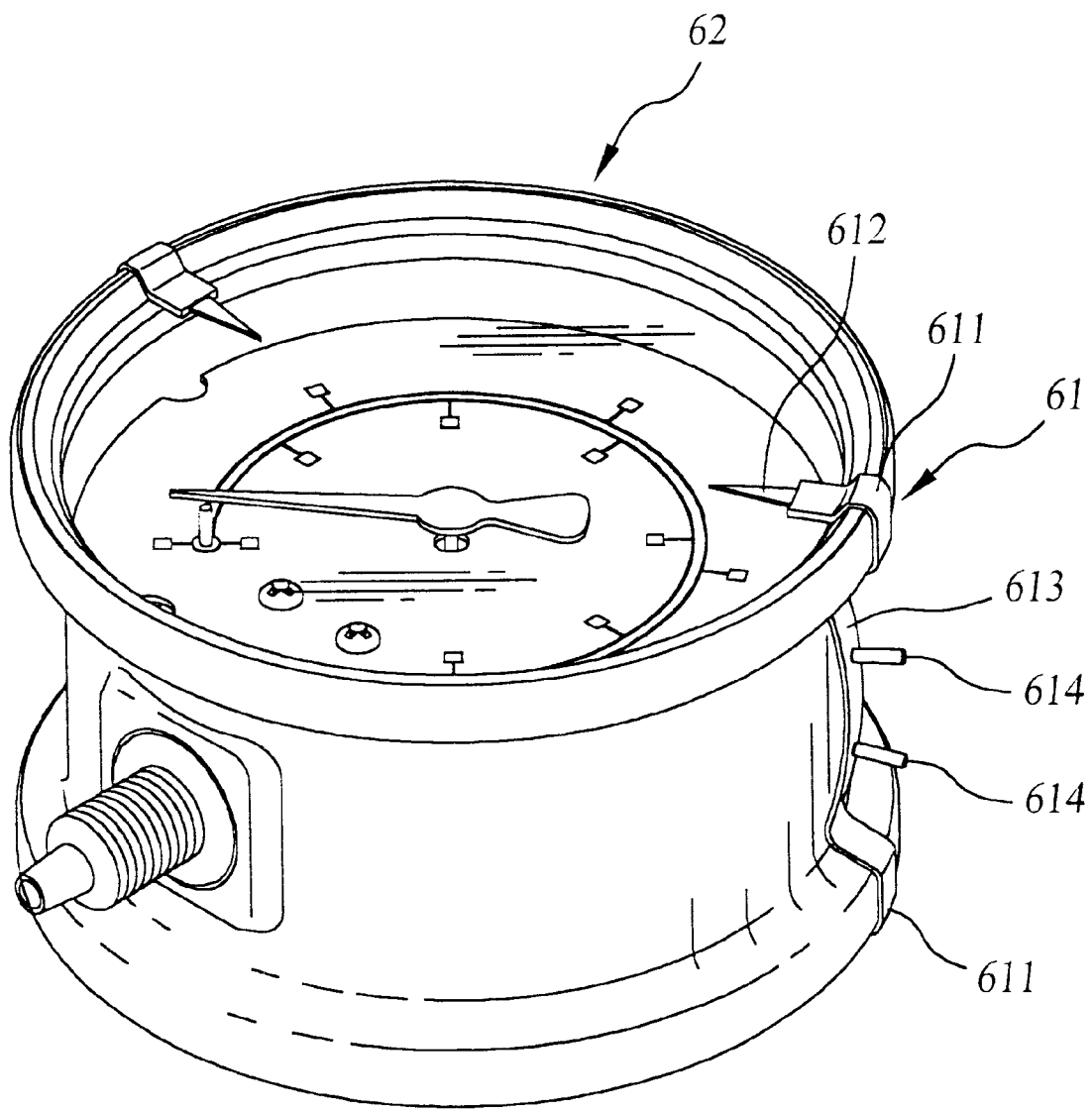
FIG. 6 shows the double-sided meter of the present invention with the clip-on indexes of FIG. 5 attached thereto.
Figure 7:
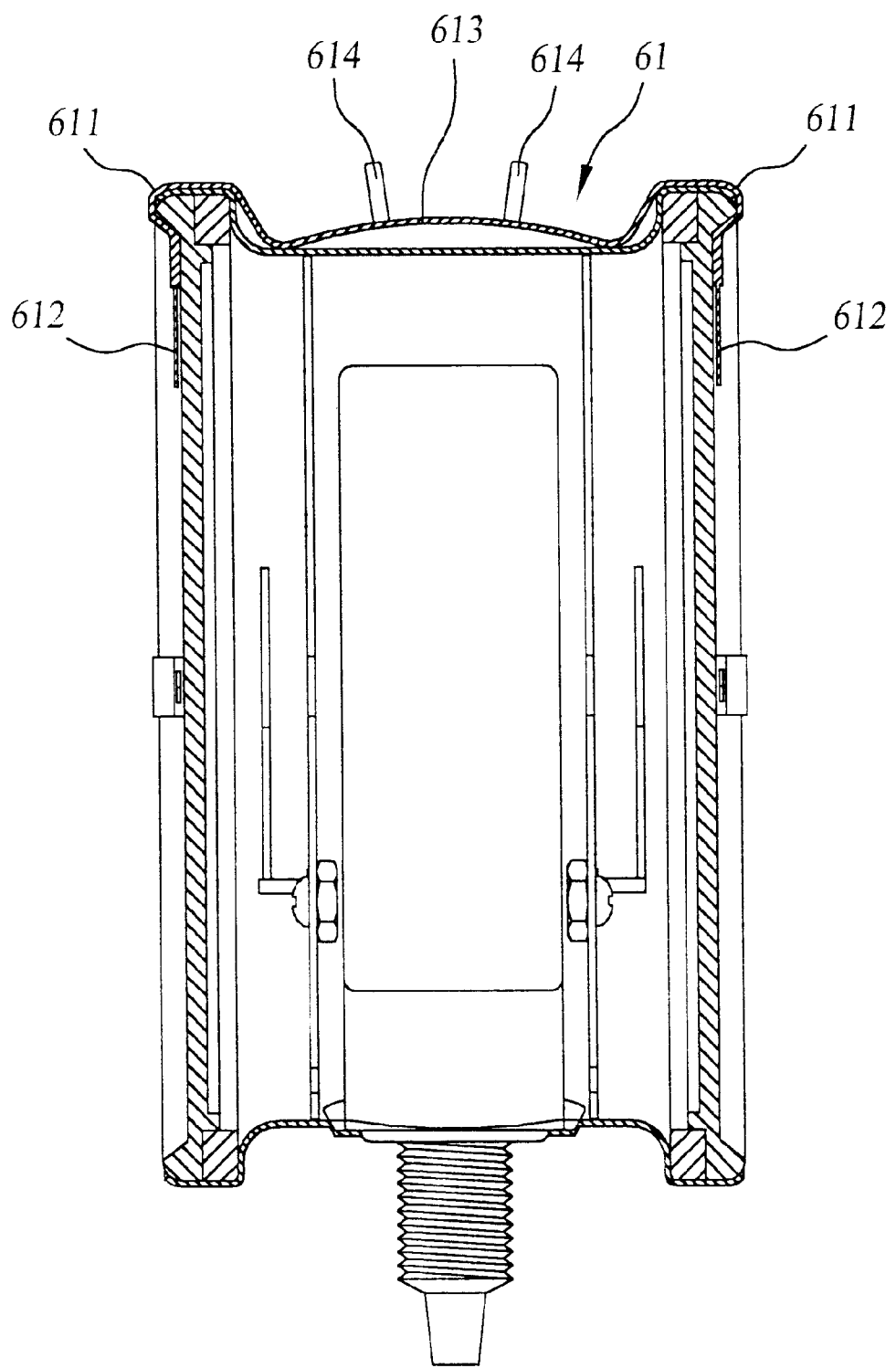
FIG. 7 is a sectioned side view of the double-sided meter of FIG. 6.

Please refer to FIGS. 6 and 7 that are assembled perspective view and sectioned side view, respectively, of a double-sided meter 62 of the present invention with two clip-on indexes 61 attached to a peripheral wall thereof. The bent portions 611 of the clip-on indexes 61 are located outside the flanges 621 to fitly catch the latter while the curved transverse sections 613 are abutted on an outside of a depressed portion of the peripheral wall between the two flanges 621, enabling the clip-on indexes 61 to firmly and stably connect to the meter 62 without the risk of separating therefrom. Particularly, the curved transverse section 613 provides an outward tension for the two bent sections 611 to more tightly clamp on the flanges 621.

Figure 8:
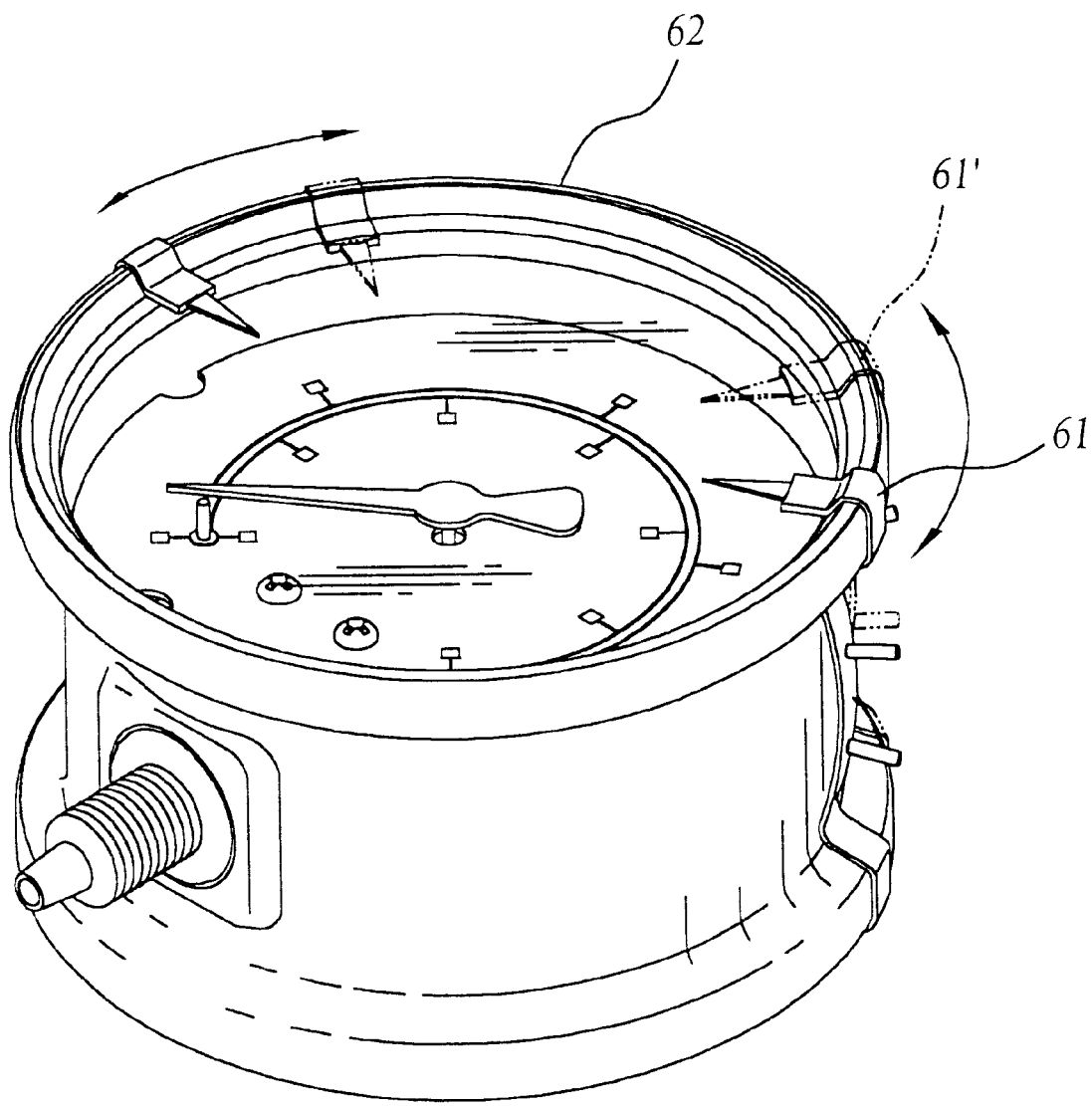
FIG. 8 shows the manner of moving the clip-on indexes on the double-sided meter of the present invention.

FIG. 8 shows the clip-on indexes 61 may be moved along the peripheral wall of the double-sided meter 62 to desired positions by pushing at the push bars 614. The two push bars 614 provided on each clip-on index 61 are spaced for an operator to extend a finger therebetween to easily adjust the clip-on index 61 on the peripheral wall of the meter 62 to the position 61'.

With the above arrangements, the double-sided meter of the present invention is a novel design enabling quick installation and convenient observations.

What is claimed is:

1. A double-sided meter, comprising:

an axially extended case having a tubular sidewall portion defining two open ends at axially opposed extremities thereof; and a measuring device mounted in said case coaxially in said sidewall portion, said measuring device including a movement, two sets of indicating means separately provided at opposing front and rear surfaces of said movement to capture said movement within said sidewall portion of said case, and a nipple sideward projected from said movement and said case to connect to a pipeline to be inspected; said indicating means being actuated responsive to said movement to indicate a reading value of any measured result;

at least one clip-on index slidably coupled to said case for adjustable displacement thereabout.

2. The double-sided meter as claimed in claim 1, wherein said indicating means are dial discs and pointers.

3. The double-sided meter as claimed in claim 1, wherein said case is provided at each of said two open ends with a seal ring, which firmly holds a transparent sheet and a gasket fitted around said transparent sheet to said open end.

4. The double-sided meter as claimed in claim 1, wherein said at least one clip-on index for attaching to a peripheral wall of said case, said clip-on index having a cross section having substantially a $\Sigma$-shaped configuration, and including two bent sections provided near two outer ends thereof and a transverse section located between said two bent sections; said bent sections having profiles corresponding to that of two flanges of said double-sided meter and having free ends formed into two index fingers to point toward scales on two sides of said meter, and said transverse section having a predetermined curvature for it to fitly abut on a depressed part of said peripheral wall of said case.

5. A double-sided meter comprising:

a case having two open ends;

a measuring device mounted in said case and including a movement, two sets of indicating means separately provided at front and rear surfaces of said movement, and a nipple sideward projected from said movement and said case to connect to a pipeline to be inspected; and said movement driving said indicating means to indicate a reading value of any measured result: and, at least one clip-on index for attaching to a peripheral wall of said case, said clip-on index having a cross section having substantially a $\Sigma$-shaped configuration, and including two bent sections provided near two outer ends thereof and a transverse section located between said two bent sections: said bent sections having profiles corresponding to that of two flanges of said double-sided meter and having free ends formed into two index fingers to point toward scales on two sides of said meter, and said transverse section having a predetermined curvature for it to fitly abut on a depressed part of said peripheral wall of said case, said at least one clip-on index being provided at an outer side of said transverse section with push bars.

6. The double-sided meter as claimed in claim 5, wherein said transverse section of said at least one clip-on index is provided with two said push bars, which are spaced by a distance slightly smaller than a width of an operator's finger.

7. A double-sided meter comprising:

a case having two open ends;

a measuring device mounted in said case and including a movement, two sets of indicating means separately provided at front and rear surfaces of said movement, and a nipple sideward projected from said movement and said case to connect to a pipeline to be inspected; and said movement driving said indicating means to indicate a reading value of any measured result; and, at least one clip-on index for attaching to a peripheral wall of said case, said clip-on index having a cross section having substantially a $\Sigma$-shaped configuration, and including two bent sections provided near two outer ends thereof and a transverse section located between said two bent sections; said bent sections having profiles corresponding to that of two flanges of said double-sided meter and having free ends formed into two index fingers to point toward scales on two sides of said meter, and said transverse section having a predetermined curvature for it to fitly abut on a depressed part of said peripheral wall of said case, said curved transverse section of said at least one clip-on index providing an outward tension for said two bent sections to firmly clamp on said flanges of said meter.

* * * * *